Patented Aug. 30, 1927.

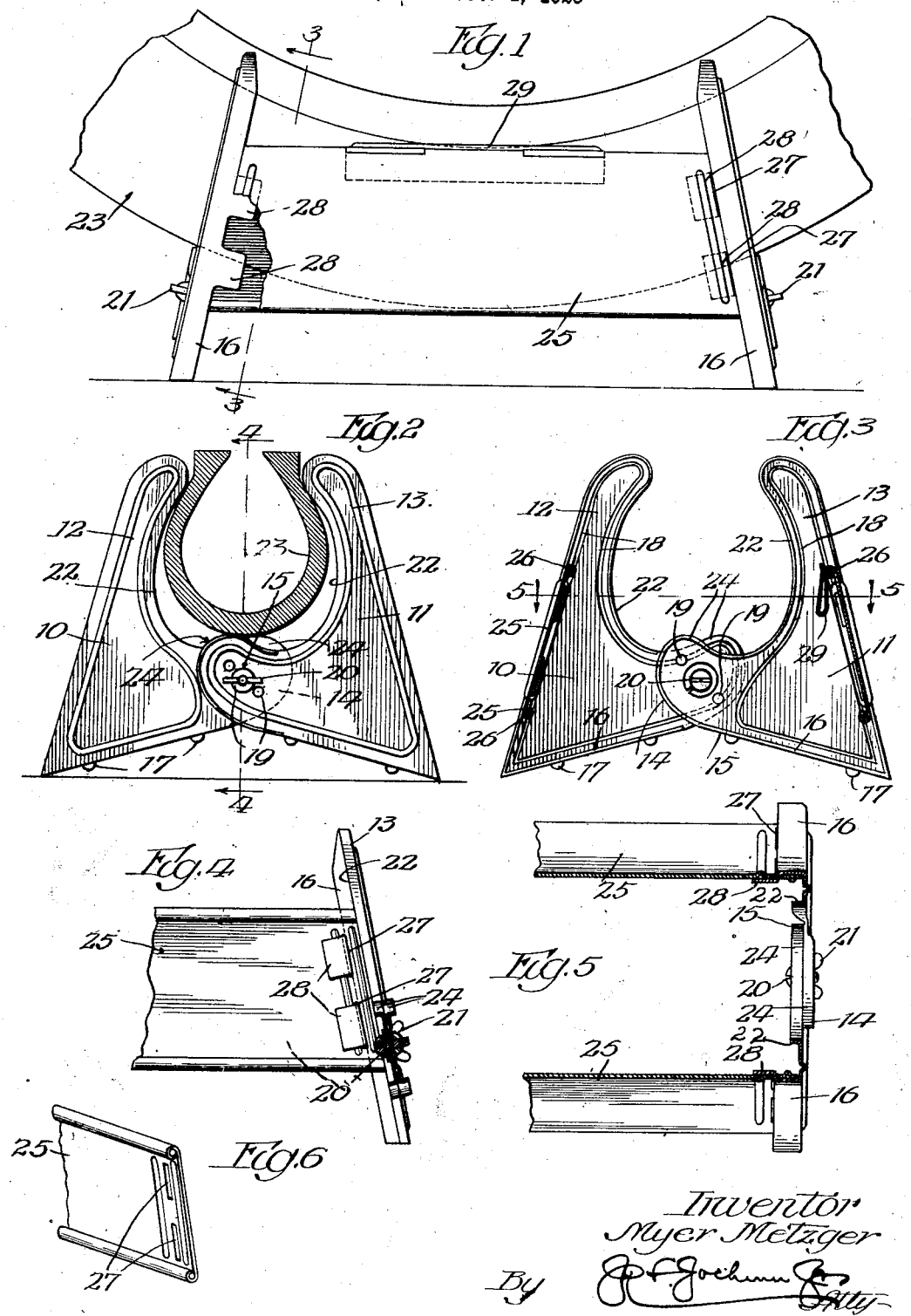

1,640,792

UNITED STATES PATENT OFFICE.

MYER METZGER, OF CHICAGO, ILLINOIS.

TIRE-DISPLAY HOLDER.

Application filed October 1, 1923. Serial No. 665,872.

In tire display holders of the type embodying two pivotally connected members between which the tire is placed, it has been customary to rely upon the weight of the tire for causing the members to grip the tire. It has, however, been found in practice that the weight of the tire is not always exerted upon the members at the proper point with relation to the pivot of the members, with the result that the members do not properly grip the tire, and with the further result that the tire will not be properly held and oftentimes when the tire is lifted with the holder connected thereto, the holder will drop from the tire.

It is one of the objects of the present invention to overcome these difficulties and objections and to provide an improved tire holder of this character in which the clamping or holding means are so shaped that portions thereof will project between the members and above the pivot point to be engaged by the tire and against which the tire abuts, to not only swing the clamping or holding means about their pivots to a clamping relation, but these portions will serve as a means for insuring a proper positioning of the tire within the holder.

A further object is to provide an improved holder of this character in which each of the clamping or holding means will be of a knock-down or sectional construction, thereby rendering it possible for the device to be shipped in a flat condition.

A further object is to provide an improved device of this character which will be simple, durable, light and compact in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a side elevation of a holder of this character, constructed in accordance with the principles of this invention, partly broken away and showing a tire in position therein.

Figure 2 is an end elevation of Figure 1, showing the tire in section.

Figure 3 is a sectional view taken on line 3—3, Figure 1, with the tire omitted.

Figure 4 is a detail sectional view taken on line 4—4, Figure 2.

Figure 5 is a horizontal sectional view taken on line 5—5, Figure 3.

Figure 6 is a detail perspective view of one of the side members.

Referring more particularly to the drawing, the numerals 10 and 11 designate generally clamping members, which may be of any desired size and constructed of any suitable sheet material, such as metal or the like. These members are shaped to form clamping jaws 12—13 and inwardly projecting extensions or portions 14—15.

The clamping members are preferably constructed of a comparatively thin sheet material and the edges thereof are preferably flanged as at 16, the bottom flanges being preferably provided with upset portions 17 to form feet for supporting the structure and for holding the bottom flange 16 out of engagement with the supporting surface. If desired, the end members may be further reenforced by means of ribs 18 upstruck therefrom.

The portions 14—15 are provided with a plurality of apertures 19 adapted to be brought into register and passing through registering apertures is a fastening device 20, preferably in the form of a bolt having a wing nut 21, thereon, the head of the bolt co-operating with the wing nut 21 for clamping the portions 15—16 together and thereby securing them against pivotal movement. The jaws 12 and 13 are provided with faces 22 adapted to engage the tire 23 when the clamping members are closed. These faces 22 are shaped to conform to the contour of the tire so that when the tire is placed within the holder and the thumb nuts 21 tightened, the supporting device will be locked to the tire so that when the tire is raised the support will be raised therewith.

The inwardly projecting portions 14—15 are so shaped that portions thereof will project on opposite sides of the fastening device 20 which forms the pivots about which the jaws move and also that when the jaws are opened, as shown in Figure 3, the extremities 24 of the portions 14—15 will project above the pivots 20 and into the space between the jaws to form an abutment for the tire and against which the tire rests when placed within the holder. When the tire is placed in the holder it will engage the abutments and pressure upon the tire will cause the jaws 12—13 to swing about their pivots so as to clamp the tire. The fastening devices may be then tightened and the holder will be secured to the tire. By reason of the apertures 19 the jaws may be adjusted with respect to each other to compensate varying sizes of tires.

The parts of the clamping members thus formed are connected together by means of side members 25, which latter are also preferably constructed of sheet material such as comparatively thin metal or the like and may, if desired, be provided with suitable re-enforcing ribs along their edges. The longitudinal edges of the side members 25 may be re-enforced by means of bars or rods 26, over which the edges of the members are curled.

Apertures 27 are provided in the side members 25 adjacent the edges thereof and these apertures are adapted to receive tongues or projections 28 carried by the clamping members 10 and 11. The apertures 27 are so arranged that when the tongues 28 are inserted thereinto, the extremity of the side members 25 will pass under the respective flanges 16 on the end members so that the ends of the side members will be covered or protected by the flanges, and the tongues 28 will also be protected by passing under the side members 25.

If desired a sign holder, designated generally by the reference numeral 29, may be connected with one of the side members 25 for holding a display sign. This sign holder 29 is flexibly connected to the side member preferably by being pivoted thereto and the side members 25 are of a width considerably less than the height of the members 12 and 13, so that the side members will not obstruct to any great extent any portion of the tire held within the holder.

With this improved construction it will be manifest that a holder may be provided which is constructed of comparatively thin sheet material. The parts are detachably connected together and all use of fastening bolts and rivets, with the exception of the pivot bolts, is dispensed with, thereby rendering it possible to collapse the holder, so that the same may be shipped in a knockdown or flat condition, and the device may be readily assembled without the use of any tools.

Obviously, various changes may be made in the details of construction and in the combination and arrangement of the several parts, within the scope of the claims, without departing from the spirit of this invention.

What is claimed as new is:—

1. A tire display holder embodying a plurality of pairs of clamping members, each pair being provided with clamping jaws, each of the jaw members being provided with an inwardly extending portion, a single pivot connecting each pair of the respective said portions of the jaw members, the said jaw members embodying formations whereby the points of pivotal connection between the jaw members may be varied, a part of each of the said portions projecting beyond the pivot and to the side of the pivot opposite to the side on which the member to which the said portion is connected is located and shaped to form, when the jaws are opened, an abutment to be engaged by the tire when placed between the jaws to operate the jaws to clamp the tire, side members for the holder, and tongue and aperture connections between the ends of the side members and the respective clamping members for detachably connecting them.

2. A tire display holder embodying a plurality of pairs of clamping members, each pair being provided with clamping jaws, each of the jaw members being provided with an inwardly extending portion, a single pivot connecting each pair of the respective said portions of the jaw members, the said jaw members embodying formations whereby the points of pivotal connection between the jaw members may be varied, a part of each of said portions projecting beyond the pivot and to the side of the pivot opposite to the side on which the member to which the said portion is connected is located and shaped to form, when the jaws are opened, an abutment to be engaged by the tire when placed between the jaws to operate the jaws to clamp the tire, side members, and interlocking means between the ends of the side members and the respective adjacent jaw members for detachably securing them together, the said side members terminating considerably short of the top and bottom of the respective clamping members.

3. A tire display holder embodying a plurality of pairs of clamping members, each pair being provided with clamping jaws, each of the jaw members being provided with an inwardly extending portion, a single pivot connecting each pair of the respective said portions of the jaw members, the said jaw members embodying formations whereby the points of pivotal connection between the jaw members may be varied, a part of each of said portions projecting beyond the pivot and to the side of the pivot opposite to the side on which the member to which said portion is connected is located and shaped to form, when the jaws are opened, an abutment to be engaged by the tire when placed between the jaws to operate the jaws to clamp the tire, side members, and tongue and aperture connections between the ends of the said side members and the respective clamping members for detachably connecting them, portions of the clamping members overlapping the adjacent ends of the side members.

In testimony whereof I have signed my name to this specification, on this 22nd day of September, A. D. 1923.

MYER METZGER.